(12) United States Patent
Stier

(10) Patent No.: US 8,677,891 B2
(45) Date of Patent: Mar. 25, 2014

(54) CHARCOAL BARBECUE ROTISSERIE GRILL COOKER

(76) Inventor: Randal J. Stier, Central Square, NY (US)

(*) Notice: Subject to any disclaimer, the term of this patent is extended or adjusted under 35 U.S.C. 154(b) by 187 days.

(21) Appl. No.: 13/282,862

(22) Filed: Oct. 27, 2011

(65) Prior Publication Data

US 2013/0104745 A1     May 2, 2013

(51) Int. Cl.
    *A47J 37/06*      (2006.01)

(52) U.S. Cl.
    USPC ..................................... 99/421 R

(58) Field of Classification Search
CPC ........... A47J 27/00; A47J 37/00; A47J 37/04; A47J 37/041; A47J 37/07; A47J 37/0704; A47J 37/0731; A47J 37/0736; A47J 37/0745; A47J 37/0763; A47J 2037/0777; A47J 2037/0795
USPC ... 99/421 R, 421 H, 421 HH, 421 HV, 421 P; 126/1 R, 25 R, 25 AA, 9 R, 9 B, 14
See application file for complete search history.

(56) References Cited

U.S. PATENT DOCUMENTS

| | | | |
|---|---|---|---|
| 3,783,855 A * | 1/1974 | Newinger | 126/25 R |
| 3,980,010 A * | 9/1976 | Collinucci | 99/421 H |
| 3,999,472 A | 12/1976 | Einto | |
| 5,218,950 A * | 6/1993 | Hait | 126/9 R |
| 5,536,518 A * | 7/1996 | Rummel | 426/523 |
| 5,823,174 A | 10/1998 | Andress | |
| 5,947,007 A | 9/1999 | O'Grady et al. | |
| 6,038,965 A | 3/2000 | Thorndyke | |
| 6,196,116 B1 * | 3/2001 | O'Grady et al. | 99/340 |
| 6,412,480 B1 | 7/2002 | Harbin | |
| 7,934,494 B1 | 5/2011 | Schneider | |
| 2002/0108502 A1 * | 8/2002 | Kim | 99/419 |
| 2003/0140798 A1 | 7/2003 | Rummel et al. | |

* cited by examiner

*Primary Examiner* — Tu B Hoang
*Assistant Examiner* — Brandon Harvey
(74) *Attorney, Agent, or Firm* — Bernhard P. Molldrem, Jr.

(57) ABSTRACT

A compact portable charcoal-fired barbecue cooker is convertible for rotisserie cooking or for grill cooking. The cooker has a fire basket or charcoal grate, which can swing or rotate between a lowered, horizontal position, used for grilling, and a raised or upright position, used for rotisserie cooking, by turning a handle positioned outside the cooker body. The rotisserie spit drops into receptacles formed in the left and right side walls of the cooker body, and with the charcoal grate upright, a drip pan can be positioned under the spit. The vents are positioned so the heated air flows over the roast. A reflector or heat shield is positioned between the upright fire basket and the rear wall of the cooker. A locking tab can releasably retain the handle in the upright position. The entire cooker can be picked up using the handle affixed to the lid.

13 Claims, 13 Drawing Sheets

CHARCOAL BARBECUE ROTISSERIE GRILL COOKER

BACKGROUND OF THE INVENTION

This invention is directed to a charcoal cooker that can be used as a grill for cooking steaks or can be used as a rotisserie for slower cooking of ribs, chicken, turkey, or the like.

In a charcoal cooker of this type, there is typically a main cooker body, often shaped as a box, with a grille removably situated at the top and a lid that can be opened for access to the grill and closed for cooking with slow, uniform heat. A rotisserie spit, i.e., one or more rods or spears that extend transversely across the cooker, is adapted to hold one or more whole chickens, roasts, or similar items, and mates with a drive for rotating the rotisserie spit during the cooking process. In some cases, a rotisserie basket is used, i.e., for barbecue cooking of pork ribs, fish, large slabs of meat, vegetables, and other items.

The typical rotisserie requires the spit rod and the grill to be positioned over the main fire box or charcoal grid, but rotisserie grilles have been lacking in means for providing uniform cooking heat over the extent of time needed for roasting, which can take over an hour. Low-heat slow rotisserie cooking may exceed two hours.

There has been a need for a small charcoal cooker for picnics, tail-gate parties, or other outings and which is capable of being used both for grilling chops and steaks, and for roasting beef and pork roasts or chickens. Because the fire is typically directly beneath the meat on the spit, juices and oils from the meat drip into the fire and the resulting smoke and fumes can affect the flavor of the roasted meat.

A few charcoal cookers have been proposed which have a vertical fire box and in which a rotisserie spit can be positioned along side the vertical fire box. However, these earlier proposed cookers are capable of being used with their fire box in the vertical orientation only. None of the fire baskets or fire boxes in the earlier charcoal cookers are capable of being used in either or both a horizontal and a vertical position, and none can be rotated between a horizontal position and a vertical position while the coals are burning.

Ideally, a picnic or tail-gating charcoal cooking oven should be completely portable, and capable of being carried in one hand by use of a handle, and further should be configured so that any removable parts, such as a grill, a rotisserie spit, drip pan, and electric spit drive motor, can be contained on or within the main body of the unit, so it can be easily carried to or from the picnic or party site, and so that it can be packed for compact storage.

OBJECTS AND SUMMARY OF THE INVENTION

Accordingly, it is an object to provide a charcoal cooker of an improved design that is simple to use and can be easily and quickly reconfigured for grilling or rotisserie cooking.

It is another object to provide a cooker that is portable and can be conveniently used for picnics or tailgating parties, and which is easily packed for storage and travel with all components carried on or inside the unit.

According to an embodiment of this invention, a charcoal-fired rotisserie/grill barbecue cooker is convertible for rotisserie cooking or for grill cooking. The cooker has a main cooker body with a bottom, back wall, a front walls, left and right side walls, and a lid hinged to the upper edge of the back wall. The side walls have rotisserie spit receptacles formed in them at their front portions, favorably as slots or cutouts with rollers or bearings for the spit, positioning the spit axis below the upper edges of cooker body, so that the rotisserie can be used with the lid closed. The rotisserie spit has first and second end members that are adapted to seat removably in the spit receptacles, and there is a meat-carrying portion, e.g., a pair of disks attached to the respective end members with meat spear(s) extending between them. One of the end members includes a hollow tubular handle, formed of a low heat-conductance material, so that the handle stays relatively cool even when in use, and the other can have a square drive member that fits into a rotisserie drive motor that is mounted on one side wall of the main body.

A generally rectangular cooking grill is dimensioned to fit removably onto the top edges of the front, rear, and side walls of the main cooker body, and is used for grilling steaks, chops, hamburgers, or other grilled meats.

At the base of the cooker is charcoal grate or fire basket, situated upon or adjacent the bottom of said main cooker body. The charcoal cooker includes a pivot rod or equivalent that is attached to the fire basket and is journalled, e.g., in the side walls at the lower rear portion of the main cooker body. This configuration makes it possible for the fire basket to rotate between a lowered position in which the fire basket is disposed generally horizontally and extends across the bottom of the cooker between the back and front walls; and a raised position in which the fire basket is disposed generally vertically or upright and is positioned near the cooker back wall. The pivot rod extends outside the main body and includes a handle or equivalent so that the user can easily move the fire basket from its lowered position to its raised or upright position. The lowered position is used for grilling and also for loading and lighting the charcoal briquets. The raised position is used for rotisserie cooking, allowing the heat to radiate from a reflector surface on the back wall of the cooker as well as from the coals, and also to allow the hot gases from the charcoal to proceed up and around the meat roast or bird on the rotisserie for even cooking. With the charcoal removed from directly beneath the spit, the drippings from the roast or bird do not fall into flames. The rotisserie spit can be positioned lower in this cooker than in a barbecue cooker that has the fire box or grate at the base and thus directly under the rotisserie spit.

In a favorable embodiment, a handle is affixed at a front portion of said lid, e.g., on a chamfered front edge of the lid, and a latch member releasably secures the lid to the front wall of the cooker main body. This construction permits the user to close the unit for travel and pick it up by the handle for carrying.

In a favorable embodiment, the fire basket is formed of steel, with a slotted or perforated floor portion, an open top, and an end wall disposed at a pivot end near the back wall of the cooker, and side walls rising from left and right edges of said floor portion. The end wall and side walls of the fire basket may also perforated or slotted for good ventilation. The pivot rod may be affixed to the fire basket at or beneath its pivot end. The pivot rod is journalled in a penetration in one or both side walls, and has a handle mounted on it outside one of the side walls. The user can grasp this handle for rotating the fire basket between its lowered and its raised positions.

In the preferred embodiment, a heat reflector, i.e., a sheet of heat-reflective steel, is positioned adjacent the back wall, and stands between the back wall and the fire basket when the fire basket is in its raised position. This heat reflector directs radiant heat forwards towards the rotisserie spit, and also separates the burning charcoal from the back wall of the cooker body, so that heat is retained in the unit and carried forward to the meat being cooked. An adjustable vent on the lid is positioned within a forward half of the lid, rather than being centered on the lid. This arrangement causes the hot combustion gases from the burning charcoal to be directed forward, over the meat on the spit, before being vented out of the unit. There can be an adjustable vent also in the lower part of the back wall to allow in fresh air for combustion. Both of these have control handles so that the venting, and hence the cooking temperature, can be controlled.

The rotisserie spit pulls apart for spearing the meat onto it, and then reassembles for cooking. That is, there is a first disk from which two (or more) meat spears extend in the axial direction, and a second disk having a corresponding set of sockets. The sockets receive the tips or points of the respective spears. One or both ends of the spit have a hollow tubular metal grip that serves as a stay-cool handle.

To add to the portability of the unit, there are swing-up legs pivotally mounted at the corners of the cooker body.

In the preferred embodiments, the main body and lid are all aluminum alloy, and the legs, grille, rotisserie spit rod, basket, and pins are stainless steel. The fire grate or fire basket is a durable sheet steel. The panels or components that make up the main cooker body are all fastened to one another by rivets, as are the panels of the lid. The spit drive motor can be a standard available square-drive design, and may operate from standard line AC, i.e., 117 V; or may be configured to run off standard 12 V DC automotive power or 24 V marine power.

The dimensions of the illustrated embodiment are about sixteen inches wide, by eleven inches high (not including the folding legs), and front-to-back about thirteen inches in depth. The height of the main cooker body portion is about seven inches and the lid about four inches.

The rotisserie spit may vary from the configuration shown here, and may include a single spit rod with flanges or spike rings with spears or pins. In that case, longer spikes can be used for turkeys and smaller spikes for chickens. A rib basket attachment can be employed on the rotisserie spit rod roasting meat items such as ribs, fish, vegetables, etc.

Additional air venting may be provided, and a drain opening may be present on the bottom or base to drain liquids as may be used in cleaning the unit.

The above and many other objects, features, and advantages of this invention will become apparent from the ensuing description of a selected preferred embodiment, which is to be considered in connection with the accompanying Drawing.

DETAILED DESCRIPTION OF THE PREFERRED EMBODIMENT

With reference to the Figures of Drawing, FIGS. 1 to 21 thereof illustrate an embodiment of the small, portable rotisserie grill barbecue cooker of this invention. The illustrated embodiment is a compact version that is suited for camping, picnic use or tail-gating use where the food is intended to feed a smaller group of persons. The cooker is portable and can be carried without difficulty in a vehicle and set up at a picnic or camping area or at a stadium parking lot. The rotisserie feature is driven using line current that can be supplied from a line AC outlet in the vehicle or from an inexpensive inverter that can be plugged into a DC accessory outlet, e.g., the "cigarette lighter" jack. Also, the unit can be converted easily between a grill configuration, e.g., for grilling chops or steaks, and a rotisserie configuration for cooking roasts, meat slabs, etc. on a rotating spit.

Figure 18A:
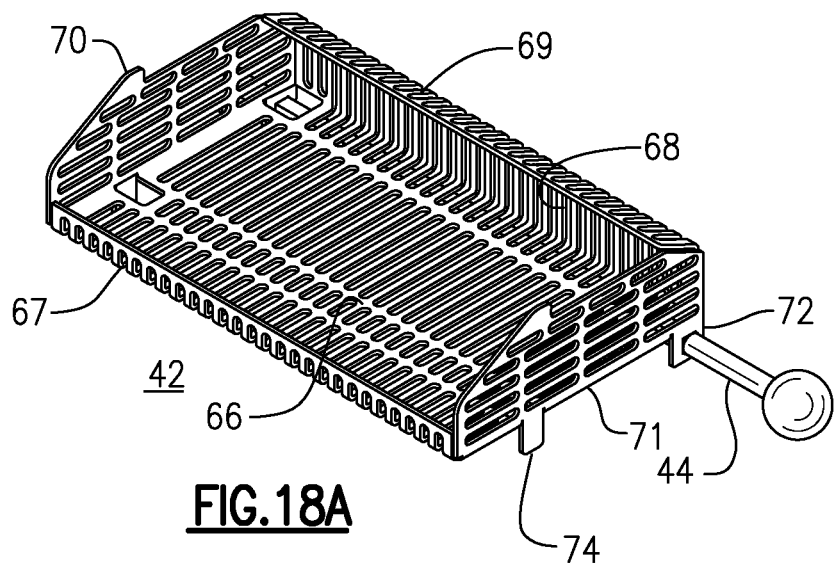
FIGS. 18A and 18B are perspective views of the charcoal basket or grate of this embodiment, in the lowered or horizontal position (for grilling) and in the raised or vertical position (for rotisserie cooking), respectively.
Figure 18B:
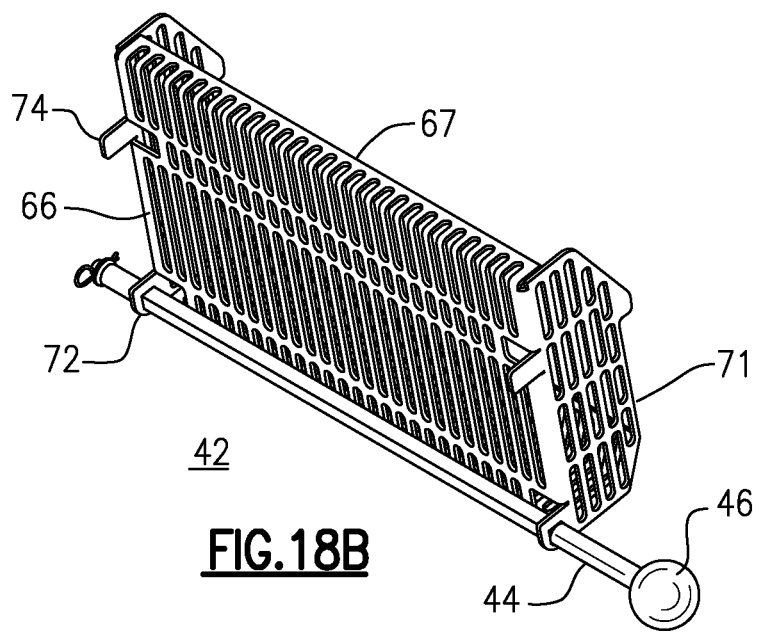
Figure 19:
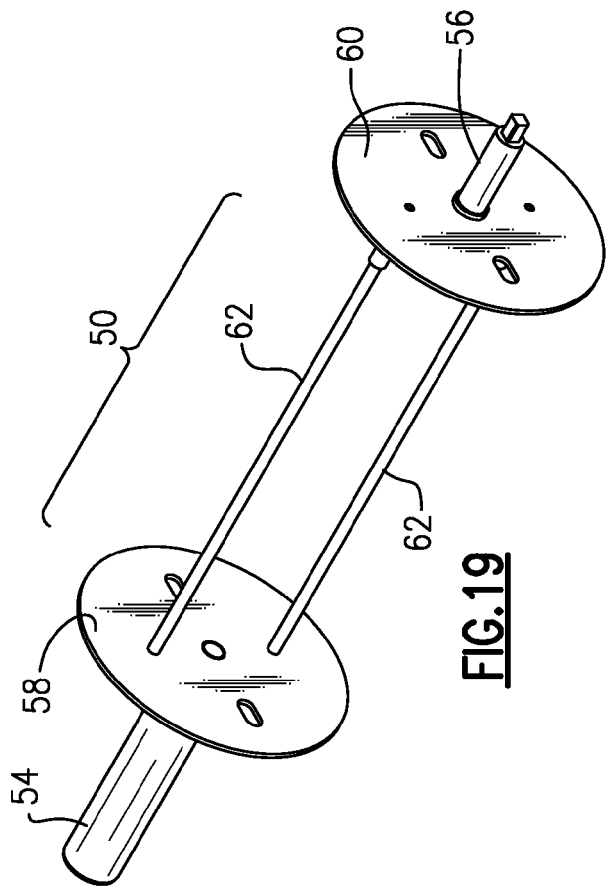
FIG. 19 is a perspective view of the rotisserie spit component of this embodiment.
Figure 20:
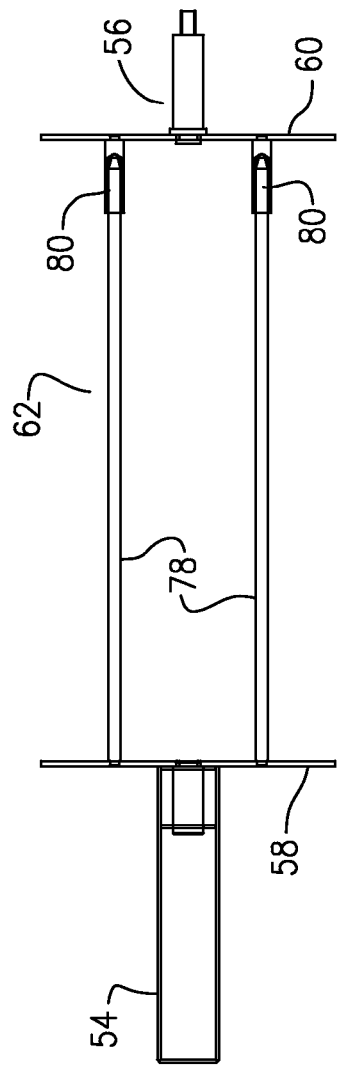
FIG. 20 is a schematic sectional view thereof.

In these drawings, FIGS. 1 to 5 and 21 illustrate the rotisserie cooker of this embodiment packed in its storage or travel configuration. FIGS. 6 to 10 show the cooker in its configuration for grilling. FIGS. 11 to 17 show this embodiment configured for rotisserie grilling. FIGS. 18A and 18B show the fire basket that can be rotated between a lowered, grilling position and an upright, rotisserie position. FIGS. 19 and 20 illustrate some details of the rotisserie spit of this embodiment.

As shown in FIGS. 1 to 5, the camper-size grill or rotisserie cooker 10 has a main body 12, preferably formed of a sturdy aluminum alloy, with a front wall 13, left and right sides 14 and 16, and a vertical rear wall 18. There is a reflector or heat shield 20 adjacent the rear wall 18 (see FIG. 10 or 16), and a base or bottom 22. A vaulted lid or cover 24 is attached by hinges 29 to the body 12 at the top of the rear wall 18, as shown. A grip or handle 26 is affixed onto a chamfered front panel of the lid 24, and a latch 28 at the front center of the lid 24 allows the lid to be releasably closed to the top of the cooker body.

A fire box or charcoal basket 42 (See FIG. 10) is positioned in the main body 12 at the base or bottom, and is pivoted on a pivot rod or spindle 44 that passes through openings or penetrations in the side walls 14, 16, near the corner where they meet the back wall 18 and the bottom 22. This will be described in more detail later. The fire box 42 is normally in the horizontal or grilling position, and as such it is positioned beneath the open top which receives a rectangular grill 40 (see FIGS. 6 and 7). The generally rectangular cooking grill 40 can be removed, if desired, to configure the cooker for rotisserie cooking.

There are recesses or receptacles 30 and 31 on the right and left sides 16, 14 for receiving a spit rod, to be described later, and a drive motor 32 for the spit rod or rotisserie is removably secured to a slide-on fixture next to the recess or receptacle 30. This drive motor has a square drive to fit onto a square projection at one end of the spit rod. The drive motor 32 can be configured for 120 AC line voltage power or for 12 or 24 volt DC automotive power.

An adjustable vent arrangement 34 is positioned on the rear wall 18, and is formed of a series of vent slits. The venting is controlled using a slide to open and close the slits. A similar slide vent 36 is formed on the top or lid 24, forward of the mid line of the lid, as shown. Here, the top vent 36 formed with slits in the front half of the flat center panel of the lid 24. This configuration places the slit directly above the axis of the rotisserie spit rod, so that during rotisserie cooking the heated air is brought forward onto and over the top vent 36, rather than simply flowing straight up from the coals. A thermometer (not numbered) is shown alongside the vent 36 in the front portion of the lid center panel. In this embodiment, a control knob 37 extends from one end of the lid for adjusting the top vent 36.

At the base of the cooker body there are four legs 38, one mounted at each corner. These can be folded down for travel or storage.

Figure 1:
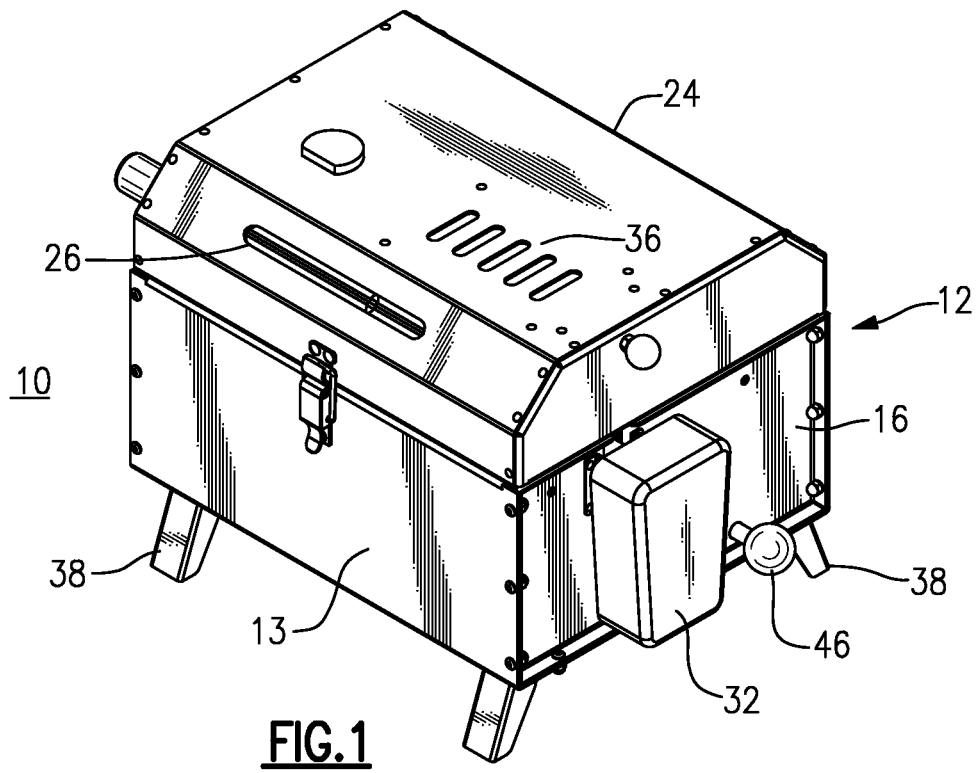
FIG. 1 is a perspective view of a charcoal barbecue cooker for grill and rotisserie cooking, according to one preferred embodiment of this invention, here shown with lid closed in the travel or storage position.
Figure 2:
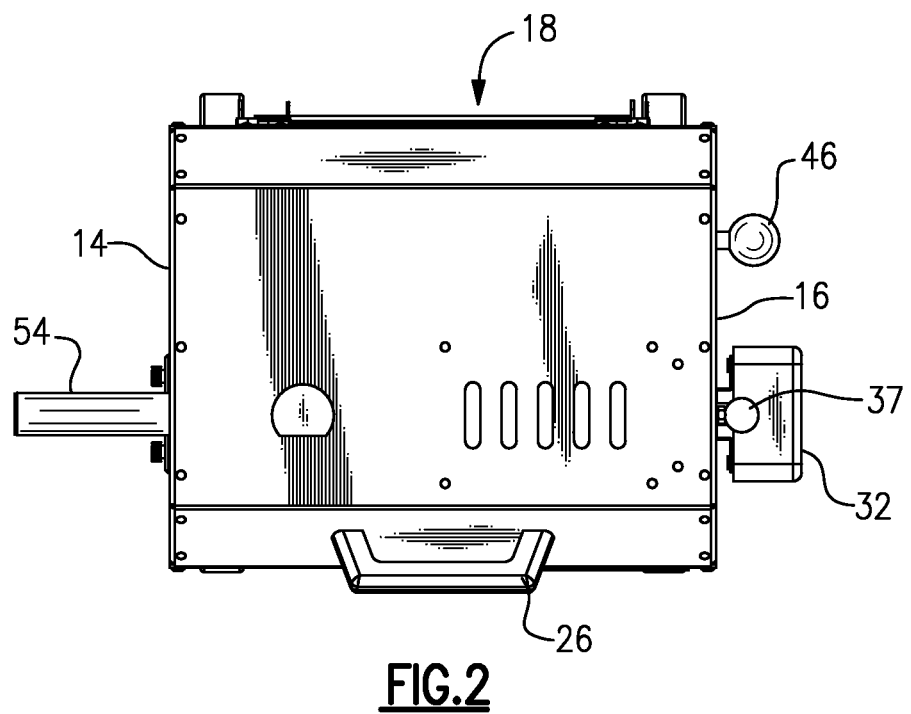
FIG. 2 is a top plan view of this embodiment.
Figure 3:
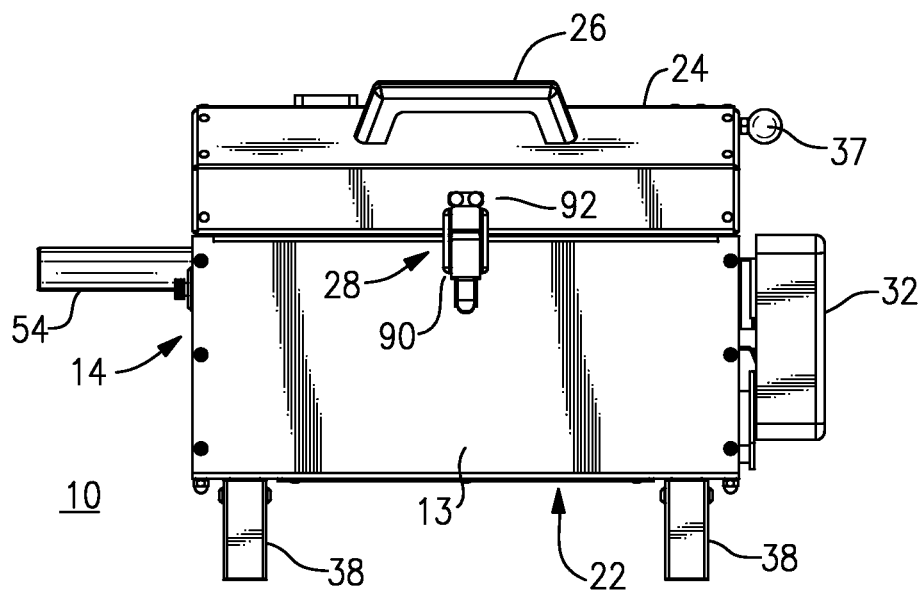
FIG. 3 is a front elevation thereof.
Figure 4:
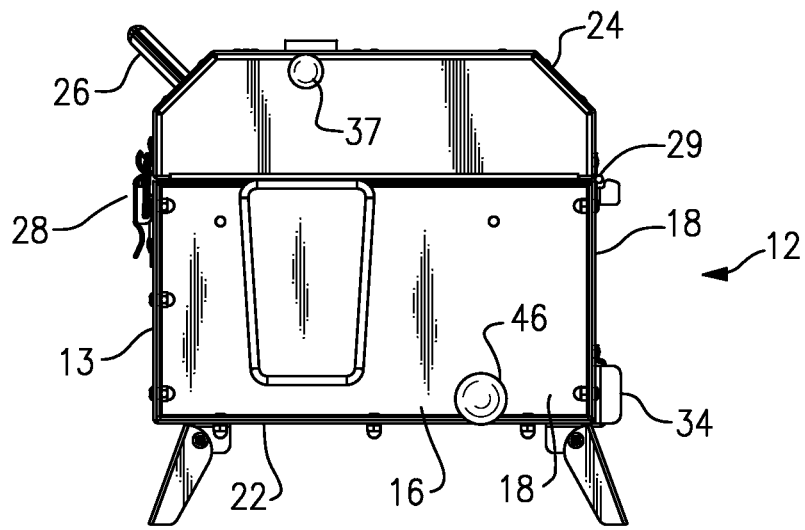
FIG. 4 is a right side elevation of this embodiment.
Figure 5:
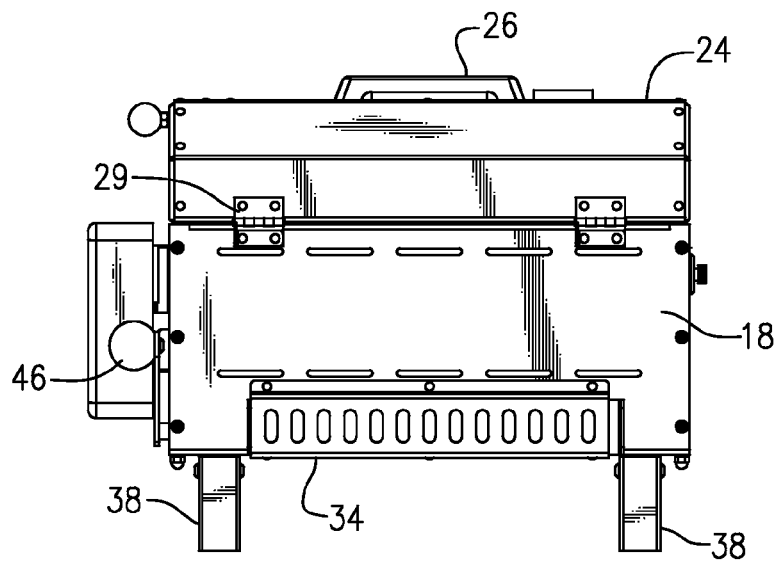
FIG. 5 is a rear perspective view of this embodiment.
Figure 6:
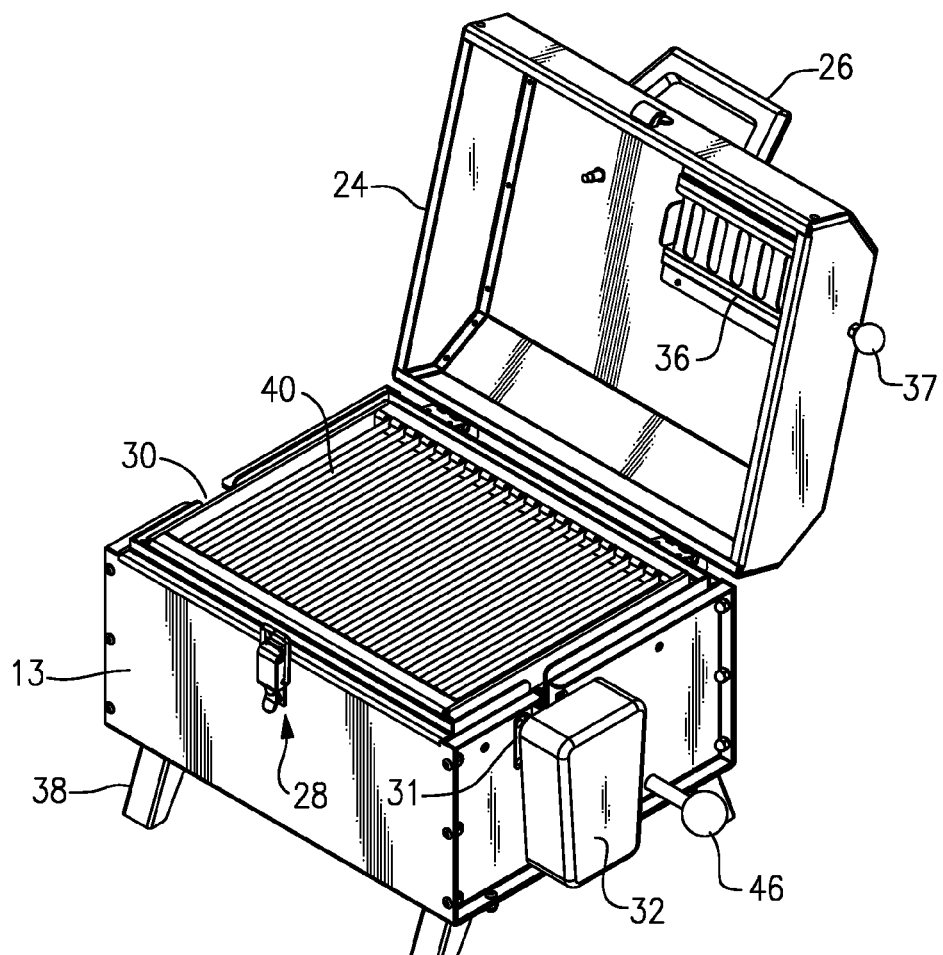
FIG. 6 is a perspective view of the charcoal barbecue cooker of this embodiment with the lid open and in the configuration for grilling.
Figure 9:
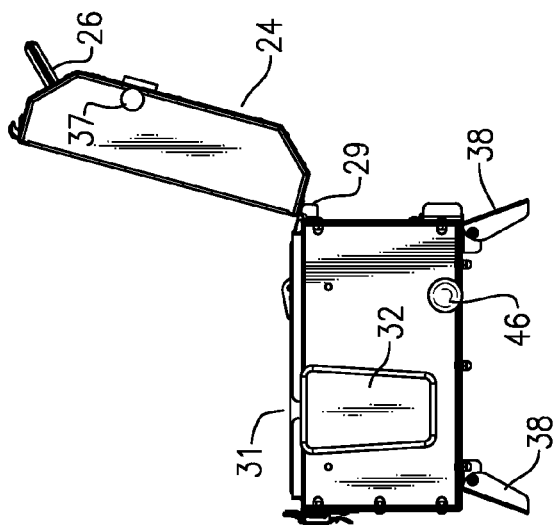
FIG. 9 is a right side elevation thereof.
Figure 8:
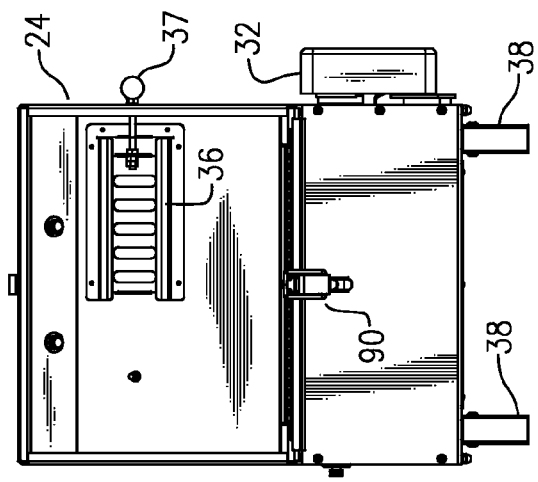
FIG. 8 is front elevation view thereof.
Figure 7:
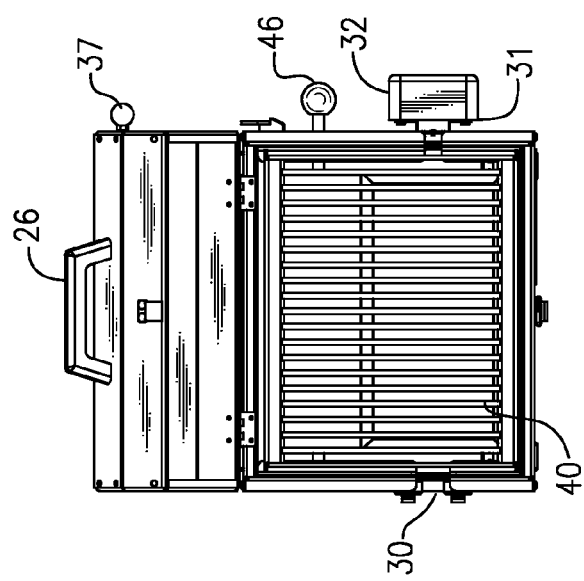
FIG. 7 is a top plan view thereof.
Figure 10:
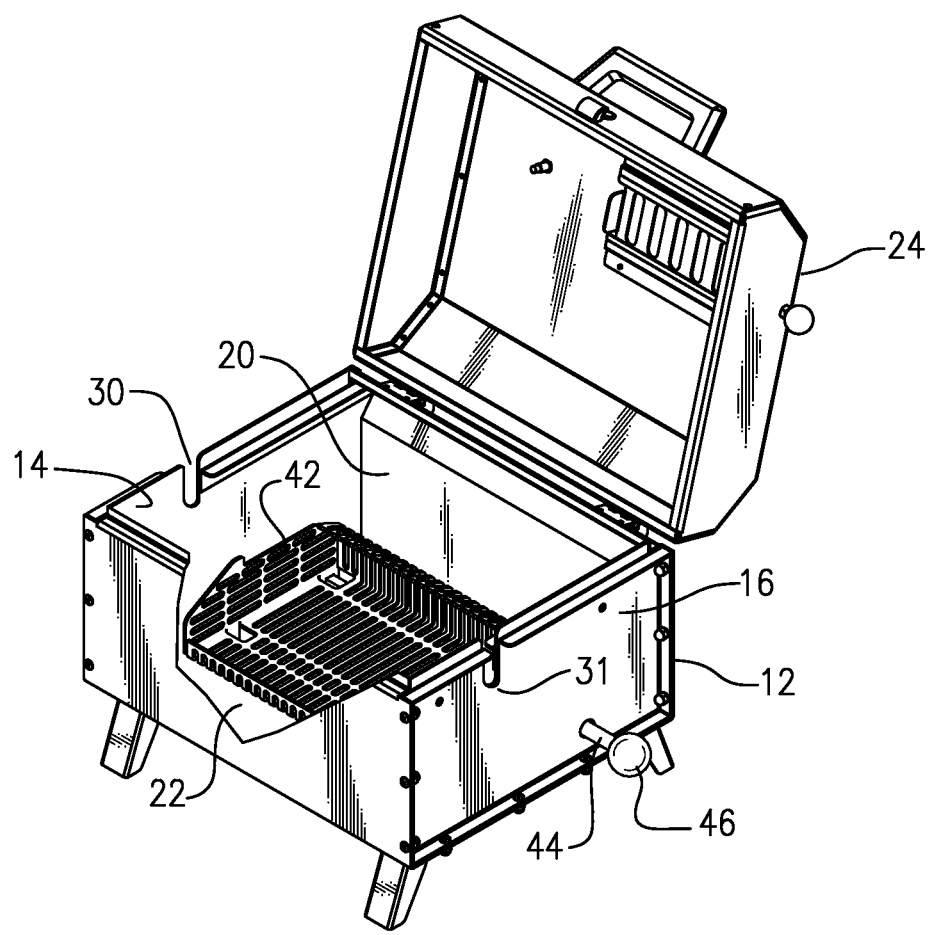
FIG. 10 is a perspective view thereof, with the top grill having been removed.
Figure 12:
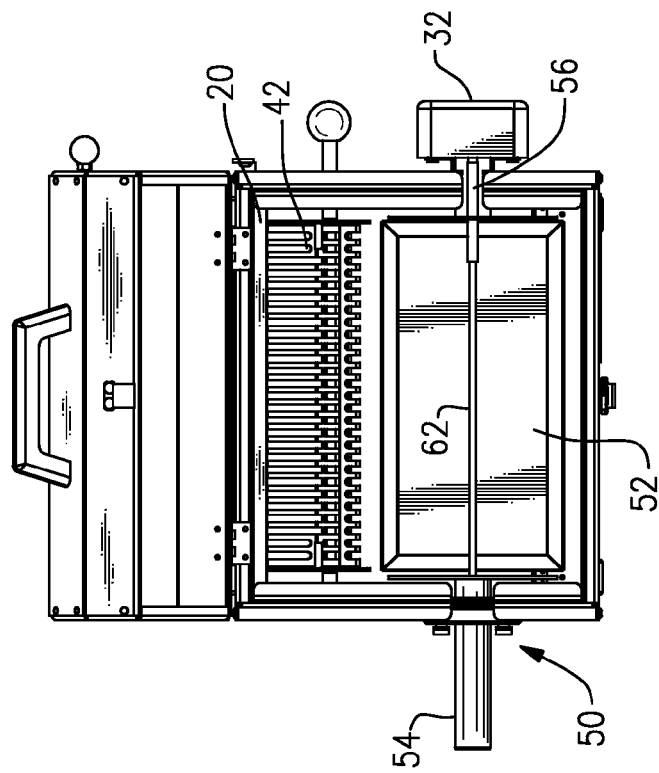
FIGS. 12 and 13 are a top plan view and front elevation view thereof, respectively.
Figure 11:
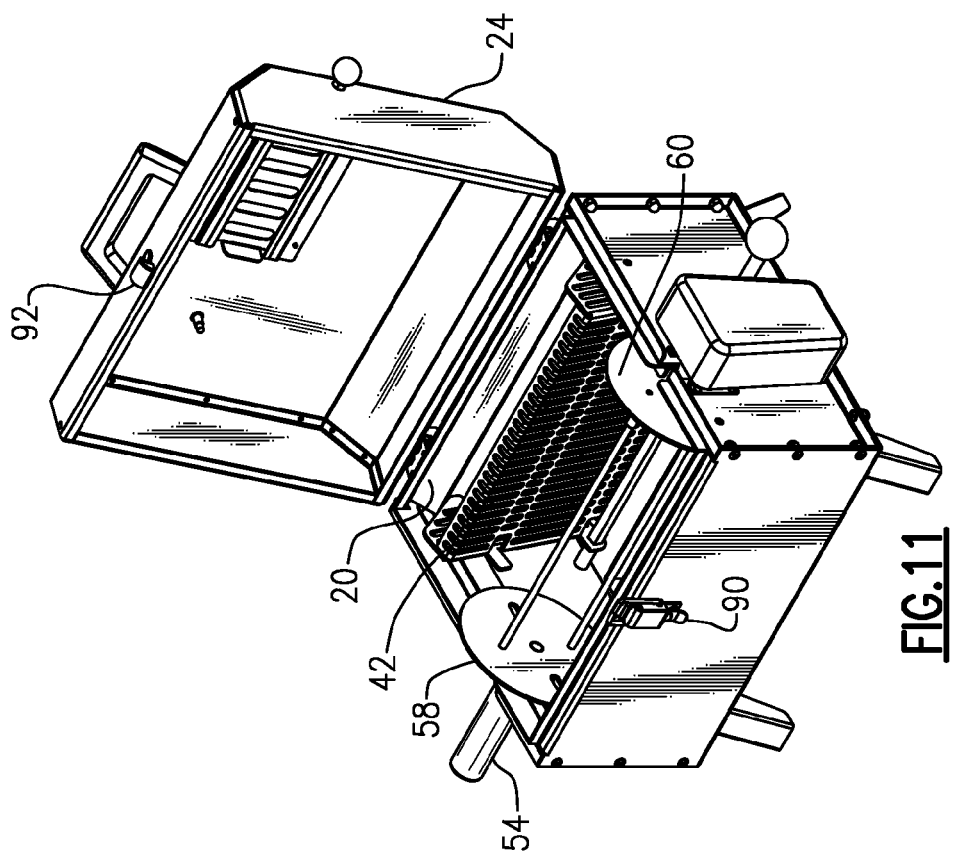
FIG. 11 is a perspective view of the charcoal barbecue grill of this embodiment, here shown configured for rotisserie cooking.
Figure 14:
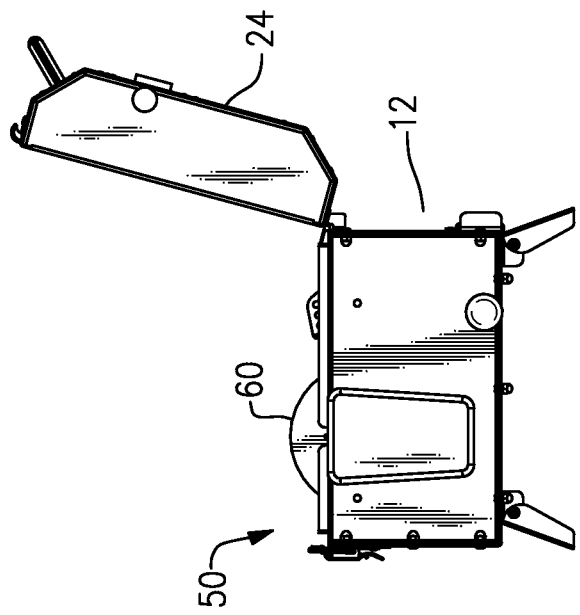
FIG. 14 is an right side elevation thereof.
Figure 13:
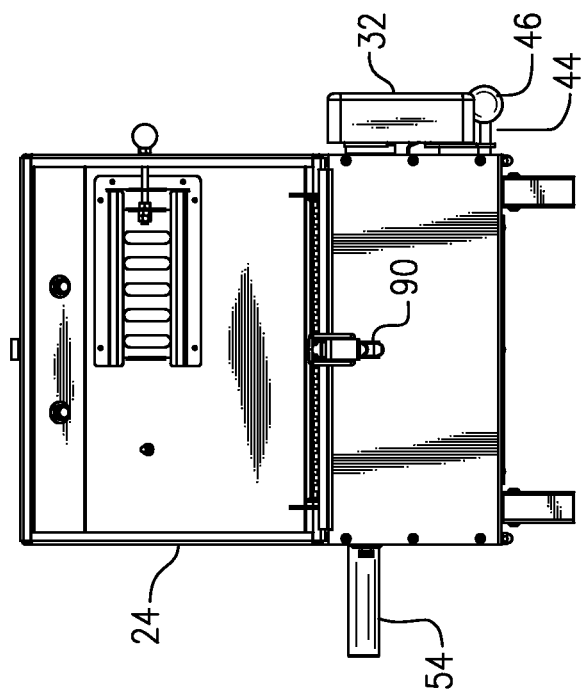

FIGS. 6 to 10 illustrate the charcoal cooker 10 set up for grilling, e.g., steaks, chops, filets, etc. The top grille 40 is formed of a frame that fits onto the top edges of the front, rear and side walls, 13, 18, 14 and 16, and a grid of elongated bars and spaces. This grille 40 is formed of a stainless steel. FIG. 10 shows the unit with the grille 40 removed, to show the fire grate or charcoal basket 42 beneath.

The fire grate or charcoal basket 42 is positioned at the bottom or base of the cooker body 12. Here the grate or basket is positioned horizontally for holding coals directly under the grille 40. The grate or basket 42 is supported on a horizontal pivot rod 44 that extends through the side walls 14 and 16. For rotisserie cooking, the basket can be raised by rotating the horizontal pivot rod 44, as will be explained later. A handle 46, here in the form of a round knob, is positioned at one end of the rod to allow the user to rotate the fire grate or basket between its horizontal grilling position and its vertical rotisserie position. An alternative handle, in the form of a crank arm which can engage a lock tab, is described later with reference to FIGS. 22, 23A and 23B.

The cooker can be arranged for rotisserie cooking as shown in FIGS. 11 to 15. For this mode of cooking, the fire is started in the fire grate in the horizontal position (e.g., FIG. 18A) and then when the charcoal pieces are completely ignited and are white, the handle 46 is turned to rotate the fire grate 42 to the upright position (FIGS. 16, 18B). This places the fire grate 42 next to the heat shield or reflector 20, which stands in front of the rear wall 18. This configuration leaves space between the upright grate 42 and the front wall 13 for the rotisserie spit 50 and any roast or meat that is skewered onto it. A drip pan 52 (see FIG. 17) may be placed onto the base or bottom wall below the spit 50.

In this embodiment, the rotisserie spit 50 has a hollow tubular handle 54, i.e., of tubular stainless steel, which fits into the receptacle 30 formed at the top edge of the left side wall. There are rollers provided here (not shown) for supporting the handle 54. At the other end is a tubular spindle end 56 which fits into the receptacle 31 in the right side wall, where the spindle end is also supported on rollers. The spindle end 56 has a square tip that fits into a drive socket of the drive motor 32. A first disk 58 is affixed onto the tubular handle 54 and a second disk 60 is affixed onto the spindle end 56. There are spit rods or spears 62 that extend between these two disks and on which the roast or other meat item is skewered.

Figure 15:
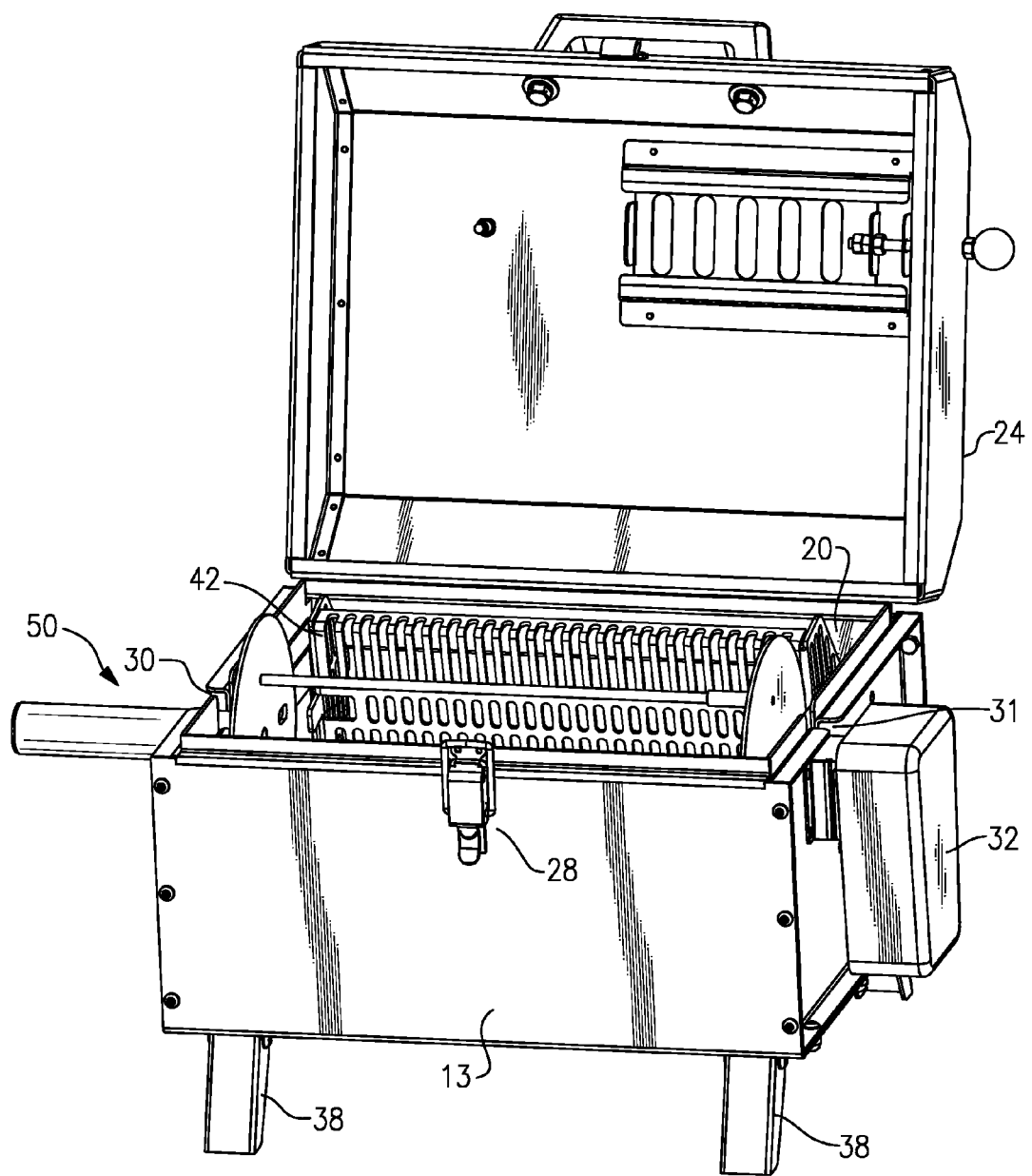
FIG. 15 is a front perspective view thereof.
Figure 16:
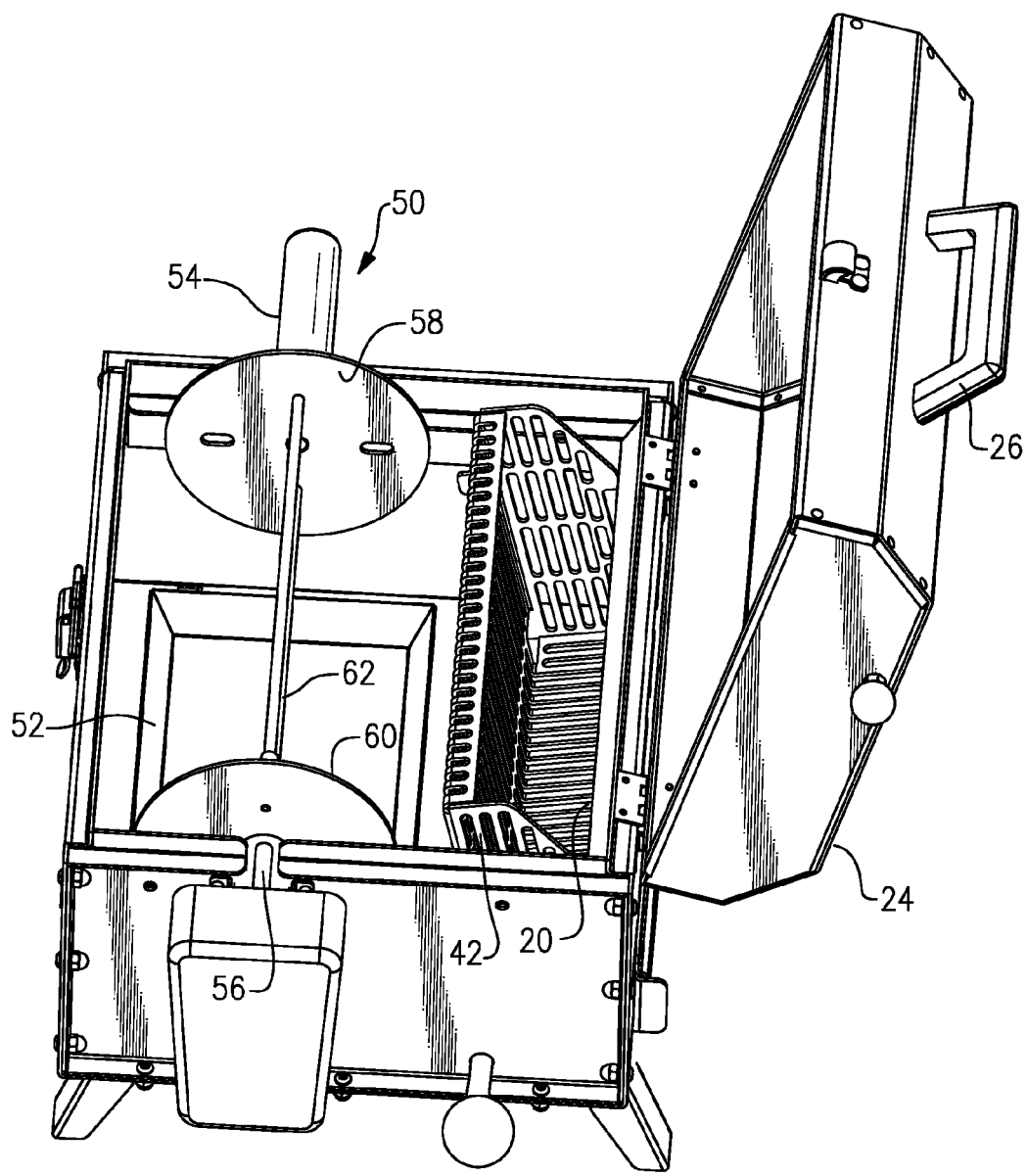
FIG. 16 is side perspective showing the rotisserie spit and the charcoal basket or grate that has been rotated to a vertical position for rotisserie cooking.
Figure 17:
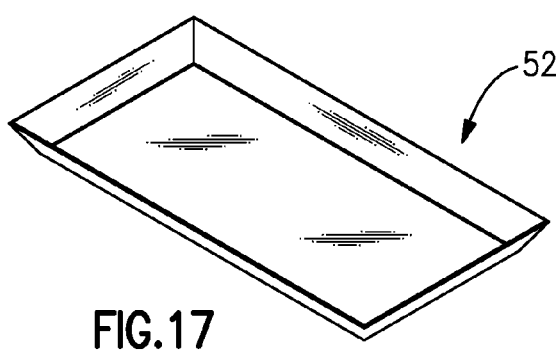
FIG. 17 is a perspective view of a drip tray employed beneath the rotisserie spit.

The fire grate or basket is shown in FIGS. 15 and 16, and in greater detail in FIGS. 18A and 18B. As aforementioned the fire grate or basket 42 is supported on pivot rod 44, with the rod 44 being affixed onto the pivot end of the basket near the corner of the rear wall and the bottom wall. In this illustrated embodiment the basket is formed of a rugged steel, with a base 66 that is perforated (e.g., formed with long bars and spaces between them), and a front lip 67 at the end remote from the pivot rod 44. The base 66 ends at a rear wall 68 that has an upper lip 69 that is directed forward. There are a pair of side walls 70 and 71 at the left and right ends of the fire basket 42. This leaves an open top above the base 66. Below the base 66 there are a pair of rear legs 72, which are penetrated by the pivot rod 44 (see FIG. 18B) and a pair of front legs 74 that rest on the bottom or base wall 22 when the grate or fire box 42 is in its lowered or horizontal position.

For rotisserie cooking, the fire grate or basket 42 is initially placed in its lowered position (FIG. 18A) and the charcoal pieces are loaded and ignited. When the charcoal has become fully ignited, and the pieces are white, the handle 46 is rotated so that the basket 42 is raised to its upright position (FIG. 16B). Then the drip tray 52 is positioned on the base 52 of the cooker body ahead of the fire basket 42, and the rotisserie spit 50, loaded with a roast, chickens, or other meat item(s) is dropped in place into the receptacles 30, 31.

The spindle end 56 of the rotisserie spit fits into a drive socket of the drive motor 32, and the lid 24 is closed. The air flow within the cooker body 12 is from the rear vent 34, through the charcoal grate or fire basket 42, and then up and around the meat on the spit 50, and out through the upper vent 36 that is positioned at the forward half of the lid 24. This arrangement ensures that the meat cooks evenly, resulting in optimal tenderness and juiciness.

Details of the rotisserie spit of this embodiment are shown in FIGS. 19 and 20. Here, a pair of spit rods 62 extend between the two disks 58 and 60. Each spit rod is comprised of a spear 78 affixed onto the disk 58 and a corresponding socket 80 affixed onto the other disk 60. The meat is skewered onto the two spears 78, and then the disk 60 and its sockets 80 are pressed onto the points of the spears 78, containing the roast or other meat item(s) between the two disks. The term "disk" as used in connection with the rotisserie spit 50 is to be interpreted broadly, and not limited to a flat, round plate, but could include other shapes that carry out the same general function, and serve as a means for supporting the spears 78 and sockets 80.

After the roast has been cooked to a desired tenderness and to the cook's taste, the rotisserie spit 50 can be lifted out using the hollow tubular stainless steel handle 54, which serves as a stay-cool handle which remains relatively cool to the touch. The rotisserie spit can be pulled apart to remove the roast for serving. The juices in the drip pan 52 can be saved for making gravy or other meat sauce.

Figure 21:
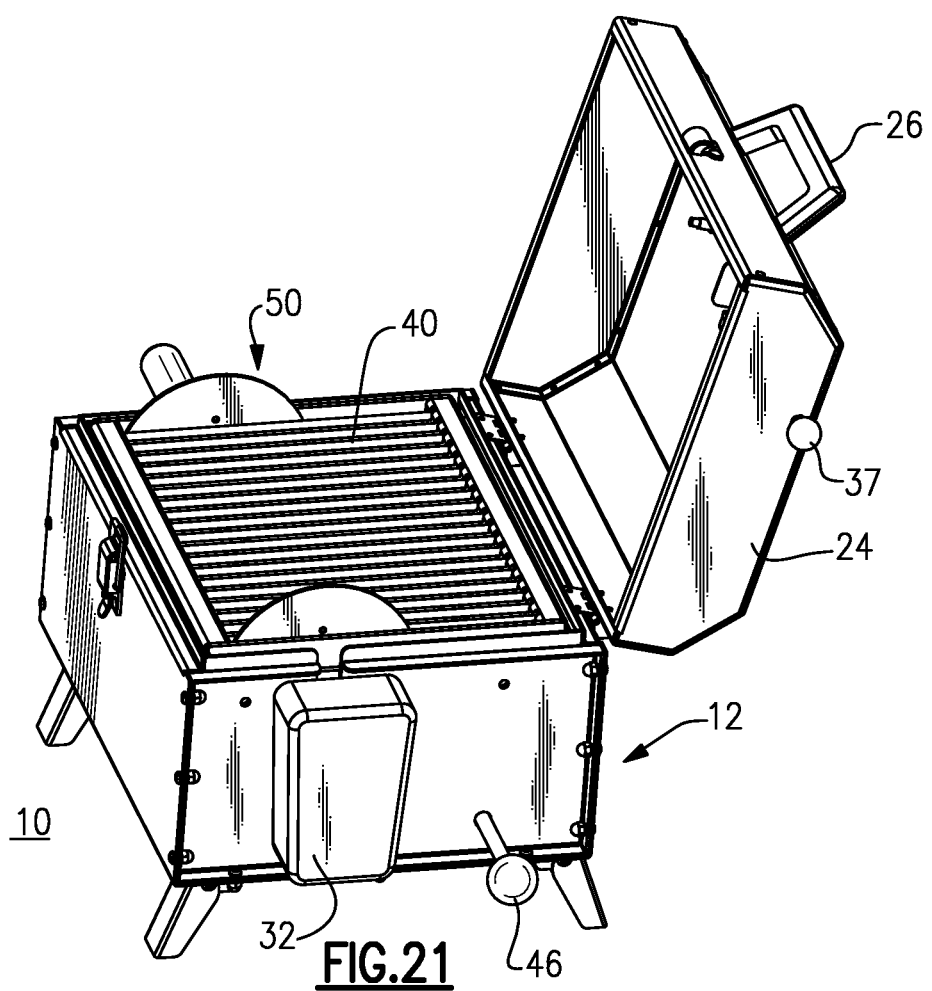
FIG. 21 is a perspective view of the charcoal barbecue cooker of this embodiment, here shown packed with the rotisserie spit and grill for travel and/or storage.

FIG. 21 illustrates the manner in which the rotisserie cooker 10 can be packed for storage or travel. The spit 50 can first be placed in the two respective receptacles 30 and 31. Then the grill 40 can be laid in place, with the two disks projecting through gaps at the sides of the grill 40. The drip pan 52 can be positioned below the grill as well. This permits the entire rotisserie grill to be contained within (or upon) the cooker body 12. The two-part latch 28 (see FIGS. 1 and 3) is shown here formed of a clamp 90 attached onto the top center of the front wall 13, and a cleat 92 at the lower front edge of the lid 24. The hinges 29 hold the back edge of the lid 24 to the cooker body. This arrangement holds the lid 24 closed, so the entire unit can be picked up and carried by the handle 26 on the lid.

Figure 23A:
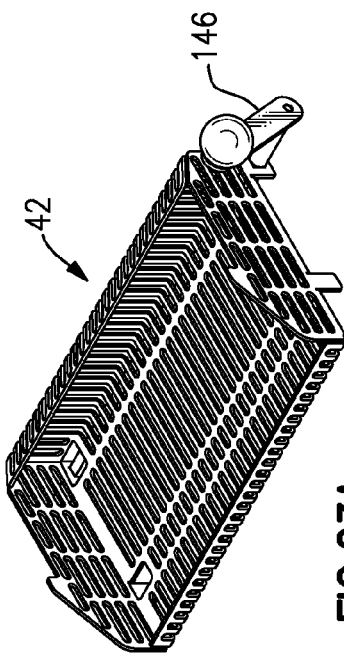
FIGS. 23A and 23B are perspective views of the fire box of this embodiment.
Figure 23B:
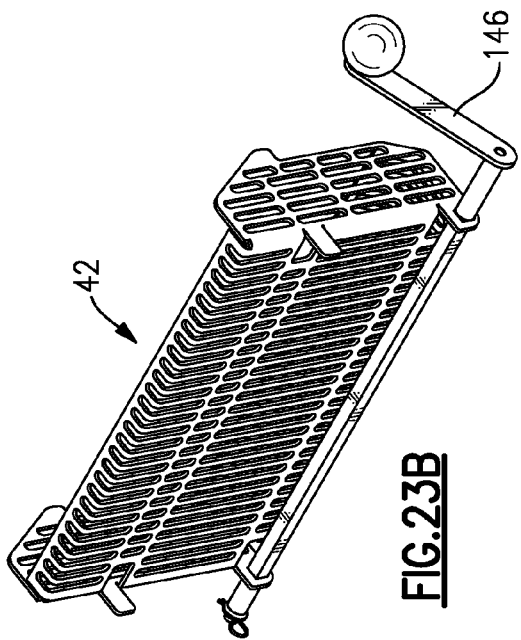
Figure 22:
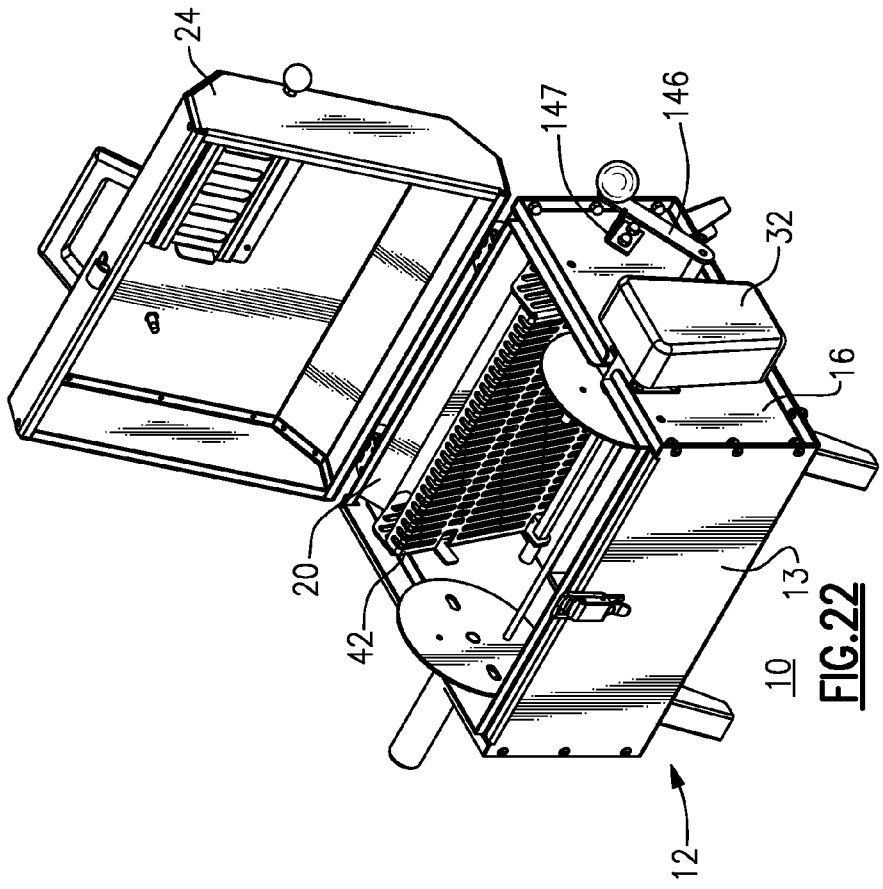
FIG. 22 is a perspective view of another embodiment thereof, with lever arm and retaining tab for the fire box pivot bar.

An alternative arrangement is shown in FIG. 22, with additional reference to FIGS. 23A and 23B. The items and elements of this arrangement that are the same as in the above described embodiment are identified with the same reference numbers, and a detailed description of those elements need not be repeated. In this embodiment the fire basket pivot rod 44 which extends through the right wall of the cooker ends at a crank handle or arm 146 for raising or lowering the grate or basket 42, rather than the simple knob 46 described earlier. A locking tab 147 is disposed on the side wall 16 and locks the arm 146 when it is turned to place the grate in the upright position. The arm can be pulled forward slightly to release it from the tab and allow the grate or basket 42 to be lowered back down to the horizontal or grilling position. The orientation of the arm 146 to the basket 42 is shown both in the horizontal position (FIG. 23A) and in the upright position (FIG. 23B).

The rotisserie spit can be used for cooking chickens, turkeys or other birds, pigs or other meat animals that can be slid onto the spit rod(s). In some possible embodiments, the spears 78 can be threaded at one end, and can be twisted into place in threaded openings in the respective disk. This can permit different configurations for different meats or different cooking styles.

In this embodiment the drive motor 32 is a standard 110-volt AC gearmotor, but this may be interchanged with an alternative 12-volt DC gear motor which can be powered from a marine or automotive electrical system. A standard square-drive motor is shown, but many other drive arrangements are possible.

Favorably, the cooker body is made of a sturdy aluminum alloy, with panels riveted together. Other parts, including the grills and rotisserie spit can be made of a stainless steel. This construction is extremely durable, with a long service life.

It should be understood that the illustrated embodiments, of particular sizes and shapes, are representative of rotisserie cookers of a range of sizes for different specific applications. Embodiments of this invention need not be limited only to those employing charcoal as a fuel source.

While the invention has been described hereinabove with reference to selected preferred embodiments, it should be recognized that the invention is not limited to those embodiments. Rather, many modification and variations would present themselves to persons skilled in the art without departing from the scope and spirit of this invention, as defined in the appended claims.

I claim:

1. A compact charcoal-fired cooking oven that is convertible for rotisserie cooking or for grill cooking, comprising
a main cooker body having a bottom, a back wall, a front wall, and left and right side walls;
a lid hinged to the upper edge of the back wall of said main cooker body;
rotisserie spit receptacles formed at front portions of top edges of the side walls of the main body;
a rotisserie spit having first and second ends adapted to seat removably in said spit receptacles, a meat-carrying portion extending between said first and said second end portions, and a rotisserie drive positioned on one side wall of the main body for rotating said rotisserie spit;
a cooking grill dimensioned to fit removably onto top edges of the front, rear, and side walls of said main cooker body;
a charcoal fire basket disposed at the bottom of said main body and including a pivot portion disposed at a lower rear portion of said main body, such that said fire basket can be rotated between a lowered grilling position in which the fire basket is disposed generally horizontally extending over said bottom between said back and front walls; and a raised rotisserie position in which the fire basket is disposed substantially upright near said back wall, wherein said fire basket includes a floor portion, an open top, and an end wall disposed facing the back wall of said main body, with said pivot portion of the fire basket being located beneath said floor portion adjacent said end wall, and side walls rising from left and right edges of said floor portion, wherein said floor portion, said end wall, and said side walls are formed of a perforated steel, each in the form of bars with spaces between the bars, such that in its lowered position said open top is beneath said grille and in said raised rotisserie position said open top faces said back wall and said perforated floor portion is disposed facing said rotisserie spit on a horizontal plane, wherein the rear wall of said fire basket has an upper lip that is directed forward, and a front lip bending upward at the end remote from said end wall; and
a transverse pivot rod affixed to said pivot portion of the fire basket, penetrating at least one of said side walls, and extending outside the main body to effectuate rotating of the fire basket between its lowered grilling position and its raised rotisserie position; such that in the rotisserie position the rotisserie spit is disposed in a horizontal plane on level with the raised fire basket, wherein said pivot rod is journaled in one of said side walls, and has a handle outside said one of said side walls to permit a user to rotate the fire basket between its lowered and its raised positions.

2. The compact charcoal-fired cooking oven according to claim 1 comprising a carrying handle affixed at a front portion of said lid, and a latch member releasably securing the lid to the front wall of said main body, allowing the user to close the cooking oven for travel and pick it up by said handle for carrying with said rotisserie spit and said grille being contained inside the cooking oven beneath the lid.

3. The compact charcoal-fired cooking oven according to claim 2, wherein said lid has a chamfered front edge at which said handle is affixed.

4. The compact charcoal-fired cooking oven according to claim 1, wherein said handle comprises a crank lever, and further comprising a retaining tab on said cooker body releasably engaging said crank lever when the latter is moved to the upright position of said fire basket.

5. The compact charcoal-fired cooking oven according to claim 1, comprising a generally flat heat reflector adjacent said back wall, to be positioned between said back wall and the open top of said fire basket when the fire basket is in its raised rotisserie position.

6. The compact charcoal-fired cooking oven according to claim 1, wherein said lid includes an adjustable vent positioned within a forward half of the lid, such that air flow within the cooker passes through the fire basket at the rear of the cooker body and then up and around meat that is on the rotisserie spit, and out through the upper vent at the forward half of the lid to ensure even cooking of said meat.

7. The compact charcoal-fired cooking oven according to claim 1, wherein said rotisserie spit includes a first disk having at least a pair of spears extending axially therefrom, and a second disk having at least a pair of sockets into which tips of the spears are received.

8. The compact charcoal-fired cooking oven according to claim 1, wherein at least one of the first and second ends of said rotisserie spit includes a hollow tubular metal grip end extending axially to serve as a stay-cool handle.

9. The compact charcoal-fired cooking oven according to claim 1 comprising swing-up legs pivotally mounted at corners of said main body.

10. The compact charcoal-fired cooking oven according to claim 1, further comprising a metal drip pan positioned beneath said rotisserie spit.

11. The compact charcoal-fired cooking oven according to claim 1, said side walls of said fire basket each having a protrusion extending vertically above said open top, when the fire basket is in its horizontal, grilling position.

12. The compact charcoal-fired cooking oven according to claim 1, wherein the side walls of said fire basket each have a foot portion extending below the floor portion, and creating a space between the floor of the fire basket and the bottom of said main cooker body when the fire basket is in its horizontal, grilling position.

13. The compact charcoal-fired cooking oven according to claim 1, wherein each of said walls of said main cooker body have a flat, horizontal top edge, the top edges together defining a horizontal grille plane, and said spit receptacles being in the form of recesses in said side walls extending to below said grille plane, such that the rotisserie spit is positioned below the grille plane and on level with the raised fire basket.

\* \* \* \* \*